United States Patent
Hashimoto et al.

(10) Patent No.: US 7,093,650 B2
(45) Date of Patent: Aug. 22, 2006

(54) HEAT CONDUCTION PIPE EXTERNALLY COVERED WITH FIN MEMBER

(75) Inventors: Yasuaki Hashimoto, Shizuoka-ken (JP); Shu Yotsumoto, Shizuoka-ken (JP)

(73) Assignee: Usui Kokusai Sangyo Kaisha, Ltd., Shizuoka-ken (JP)

( * ) Notice: Subject to any disclaimer, the term of this patent is extended or adjusted under 35 U.S.C. 154(b) by 0 days.

(21) Appl. No.: 10/932,170

(22) Filed: Sep. 1, 2004

(65) Prior Publication Data

US 2005/0082051 A1    Apr. 21, 2005

(30) Foreign Application Priority Data

Sep. 1, 2003  (JP) .............................. 2003-309136
Dec. 15, 2003  (JP) .............................. 2003-416348

(51) Int. Cl.
  F28F 1/36  (2006.01)
  F28F 19/02  (2006.01)

(52) U.S. Cl. ..................................... 165/184; 165/133
(58) Field of Classification Search ............... 165/133, 165/134.1, 179, 182, 173, 184; 156/290; 29/890.048

See application file for complete search history.

(56) References Cited

U.S. PATENT DOCUMENTS

| | | | | |
|---|---|---|---|---|
| 1,578,254 A | * | 3/1926 | Bennett | 205/180 |
| 1,928,639 A | * | 10/1933 | Berg | 136/201 |
| 2,667,337 A | * | 1/1954 | Chapman | 165/184 |
| 3,519,070 A | * | 7/1970 | Bappler | 165/184 |
| 4,102,027 A | * | 7/1978 | Greever et al. | 29/890.048 |
| 2002/0074114 A1 | * | 6/2002 | Fijas | 165/184 |

FOREIGN PATENT DOCUMENTS

| | | | |
|---|---|---|---|
| JP | 55133819 A | * | 10/1980 |
| JP | 58136995 A | * | 8/1983 |
| JP | 59225297 A | * | 12/1984 |
| JP | 10-026489 | | 1/1988 |
| JP | 3-47987 | | 2/1991 |
| JP | 8-188884 | | 7/1996 |
| JP | 9-42573 | | 2/1997 |
| JP | 9-136111 | | 5/1997 |
| JP | 2750710 | | 2/1998 |
| JP | 10-315295 | | 12/1998 |
| JP | 2954555 | | 7/1999 |
| JP | 11-325778 | | 11/1999 |
| JP | 2003-194486 | | 7/2003 |
| JP | 2003-194487 | | 7/2003 |
| JP | 2003-214792 | | 7/2003 |
| JP | 2003-307396 | | 10/2003 |
| JP | 2004-156561 | | 6/2004 |

* cited by examiner

*Primary Examiner*—Tho Duong
(74) *Attorney, Agent, or Firm*—Jordan and Hamburg LLP

(57) ABSTRACT

It is an object of this invention to obtain a heat conduction pipe superior in corrosion resistance as well as heat exchange efficiency between fluid flowing respectively through an inside and an outside for great heat radiation property and endothermic characteristics. It is also object of this invention to form the heat conduction pipe superior in the corrosion resistance as well as the heat radiation property and endothermic characteristics at inexpensive price. To achieve the above, at least single resin coating layer is formed on an outer circumferential surface of a metal pipe, a metal fin member is spirally wound on an outer circumferential surface of the resin coating layer with a side end surface the metal fin member in contact. The winding contact portion is made to encroach a surface of the resin coating layer to form the heat conduction pipe.

22 Claims, 9 Drawing Sheets

HEAT CONDUCTION PIPE EXTERNALLY COVERED WITH FIN MEMBER

BACKGROUND OF THE INVENTION

1. Field of the Invention

This invention relates to a heat conduction pipe having a corrosion resistance used in fluid cooling pipes of automobiles and construction machines, air conditioners for regulating temperature and humidity of residential space, or the like under corrosive environment, and further is to obtain a heat conduction pipe that can exchange effectively heat according to great heat radiation property and endothermic property thereof as well as superiority in a corrosion resistance.

2. Description of Related Art

Conventionally, as a heat conduction pipe having corrosion resistance, some metal pipes such as described in Japanese Patent Application Publication Nos. JA-8-188884 and JA-10-315295 has existed, e.g., steel pipes or aluminum pipes hold anticorrosion plating, e.g., zinc plating or a chromate film; thermoplastic resin coating layer, e.g., polyamide (PA), polyptopylene (PP), polyethylene (PE), or the like is formed by means of extrusion molding on an outer circumferential surface of the metal pipe. By utilizing shock absorption, water resistance, chemical resistance, or the like of the resin coating layer, the anticorrosion plating layer and the metal pipe are prevented from receiving damages due to bounding stones while the metal pipe is prevented from oxidizing due to, e.g., mud or chemicals, thereby enhancing the corrosion resistance property of the heat conduction pipe.

Other heat conductive pipes, on the other hand, such as described in Japanese Patent Application Publication Nos. JA-9-42573, JA-9-136111, and JA-11-325778 have existed, wherein a long metallic flat plate is wound spirally on an outer circumference of the metal pipe to form a fin member in a projecting manner on the outer circumference of the metal pipe, thereby improving heat radiation property and endothermnic property of the heat conductive pipe.

The heat conductive pipe holding the resin coating layer as described in Japanese Patent Application Publication Nos. JA-8-188884 and JA-10-315295, however, has a problem in terms of the heat radiation property and the endothermic property thereof because the resin coating layer is thickly formed for improving shock resistance and the corrosion resistance, so it is difficult to improve heat exchange efficiency among fluids mutually flowing though the interior and exterior of the heat conduction pipe.

With the heat conduction pipe attaching the metal fin member in the projecting manner as described in Japanese Patent Application Publication Nos. JA-9-42573, JA-9-136111, and JA-11-325778, on the other hand, it is possible to obtain high heat exchange efficiency owing to the enlarged heat exchange area, but the anticorrosion plating layer on the surface of the metal pipe is easily damaged due to, e.g., the bounding stones, so there rises a problem with the corrosion residence.

Furthermore, the fin member made of the metallic material in a flat plate shape having a contact portion, is formed in a spiral shape and wound on the metal pipe, and therefore, spiral buckling is occurred due to resilient force of the metallic material as formed with wave form edges at the contact portion thereof in contact with the metal pipe, so that adhesion between the fin member of the contact portion and the outer circumferential surface cannot be done in a good manner, so that good thermal conductivity between the metal pipe and the fin member cannot be obtained.

To prevent the buckling phenomenon from occurring, both side end surfaces of the fin member in the spiral shape are secured to the metal pipe by clips, screws, or the like, but manufacturing process takes many steps, and further, the connection between the fin member and the metal pipe by the above-described process is not enough. A gap between the fin member and the metal pipe, therefore, needs to be plugged by, e.g., coating or brazing, so that the operation process is so complicated and that it is difficult to improve the productive efficiency.

SUMMARY OF THE INVENTION

To solve aforementioned problems, it is an object of the invention to prevent a fin member from buckling where the fin member is spirally wound on an outer circumference of a metal pipe, to obtain a heat conduction pipe superior in thermal exchange efficiency by enhancing a connectivity between the fin member and the metal pipe to increase thermal conductivity thereof. It is another object of the invention to make manufacturing process of the heat conduction pipe easy by a buckling prevention effect of the fin member and to improve productivity. Furthermore, it is yet another object to maintain great heat exchange efficiency by increasing corrosion resistance and shock resistance and by improving durability of the heat conduction pipe.

To solve the aforementioned problems, this invention is for a heat conduction pipe externally covered with a fin member including a metal pipe, at least single resin coating layer formed on an outer circumferential surface of the metal pipe, and the metal fin member wound spirally on an outer circumferential surface of the resin coating layer, where the metal fin member has a side end surface, serving as a winding contact portion, in contact with the outer circumferential surface, and where the winding contact portion encroaches a surface of the resin coating layer.

The metal fin member may have the side end surface formed in a wave form to encroach the resin coating layer.

The resin coating layer may have a thickness between 0.1 and 1.0 mm.

The resin coating layer encroached with the metal fin member may be heated and melted at a temperature of 100 to 130% of the melting temperature of the resin coating layer to adhere the fin member to the resin coating layer.

Either or both of the metal fin member and the metal pipe may be formed of an iron material.

Either or both of the metal fin member and the metal pipe may hold at least one layer of an anticorrosion plating layer on the surface thereof.

Either or both of the metal fin member and the metal pipe may be covered with zinc, tin, nickel, aluminum or alloy based on those metals.

The metal fin member and the metal pipe may have a surface on which baking paint may be made at a baking temperature of 100 to 130% of the melting temperature of the resin coating layer.

The metal fin member may be in a straight shape having the same cross section from one end to the other end.

The fin member in the straight shape may have an encroaching depth of 10 to 60% of the resin coating layer's thickness into the resin coating layer.

The metal fin member may have a contact portion width in contact with the resin coating layer wider than a formation width of a body portion of the metal fin member and may have a cross section in a reversed letter T shape, and wherein the formation width of this contact portion may be within 200% of the formation width of the body portion.

The fin member in the reversed letter T shape may have the encroaching depth into the resin coating layer between 5 and 30% of the thickness of the resin coating layer.

The resin coating layer may have a resin material including either or both of particles and fibers having a higher heat conductivity than that of the resin material forming the resin coating layer.

The resin coating layer may contain carbon nano-fibers in the resin material forming the resin coating layer.

The carbon nano-fibers may be contained in an amount more than 5 wt % and less than 30 wt %.

The resin coating layer may be formed of two layers on outer circumferential surface of the metal pipe.

With this invention structured like the above, in a state of a side end surface of the fin member encroaching the surface of the resin coating layer formed on the outer circumference of metal pipes, e.g., steel pipes, aluminum pipes, or the like, the fin member is spirally wound to be well prevented from buckling for strengthening fitness between the fin number and the metal pipe, so it is possible to form adherently the fin member and the metal pipe as stabilized each other with preventing occurrence of a gap between the metal pipe and the fin member. Therefore, the thermal conductivity though the resin coating layer between the metal pipe and the fin member can be improved. Heat exchange area is enlarged by forming the metal fin member, so that the heat conduction pipe even using the resin material can obtain equal or greater heat radiation property and endothermic property than those of a product solely made of metallic material, and therefore, the heat conduction pipe superior in heat exchange performance can be obtained.

The fin member encroaches the resin coat layer as secured each other to prevent the fin member in a spiral shape from buckling owing to resilient force of the metallic material, so operation for forming the fin member to the metal pipe can be easily made, whereas the productivity can be improved while the durability for, e.g., vibration of the heat conduction pipe or fluid pressure of the fluid flowing through the outer circumference of the heat conductor, is also improved, whereas the great heat exchange performance can be maintained. Because the resin coat layer is formed, the shock resistance for the bounding stones and the corrosion resistance for rain water, mud, or the like can be increased, so that the great thermal exchange performance of the heat conduction pipe can be maintained.

By using the heat conduction pipe having the great heat exchange performance like the above, the heat conduction pipe can enjoy the improved property such as endothermic property and heat radiation property of fluid cooling pipes in automobiles and construction machines, air conditioners-for regulating temperature and humidity of residential space, and in various pipes, and enjoy the improved property of the heat exchange performance, the corrosion resistance, heat resistance, and the durability of multi-tubular thermal exchangers for general industry, heaters, hot water supply, or the like while manufactured at a low cost.

BRIEF DESCRIPTION OF THE DRAWINGS

The above and other objects, features and advantages of the present invention will become more apparent from the following description of the presently preferred exemplary embodiments of the invention taken in conjunction with the accompanying drawing, in which.

DETAILED DESCRIPTION OF REFERRED EMBODIMENTS

Figure 1:
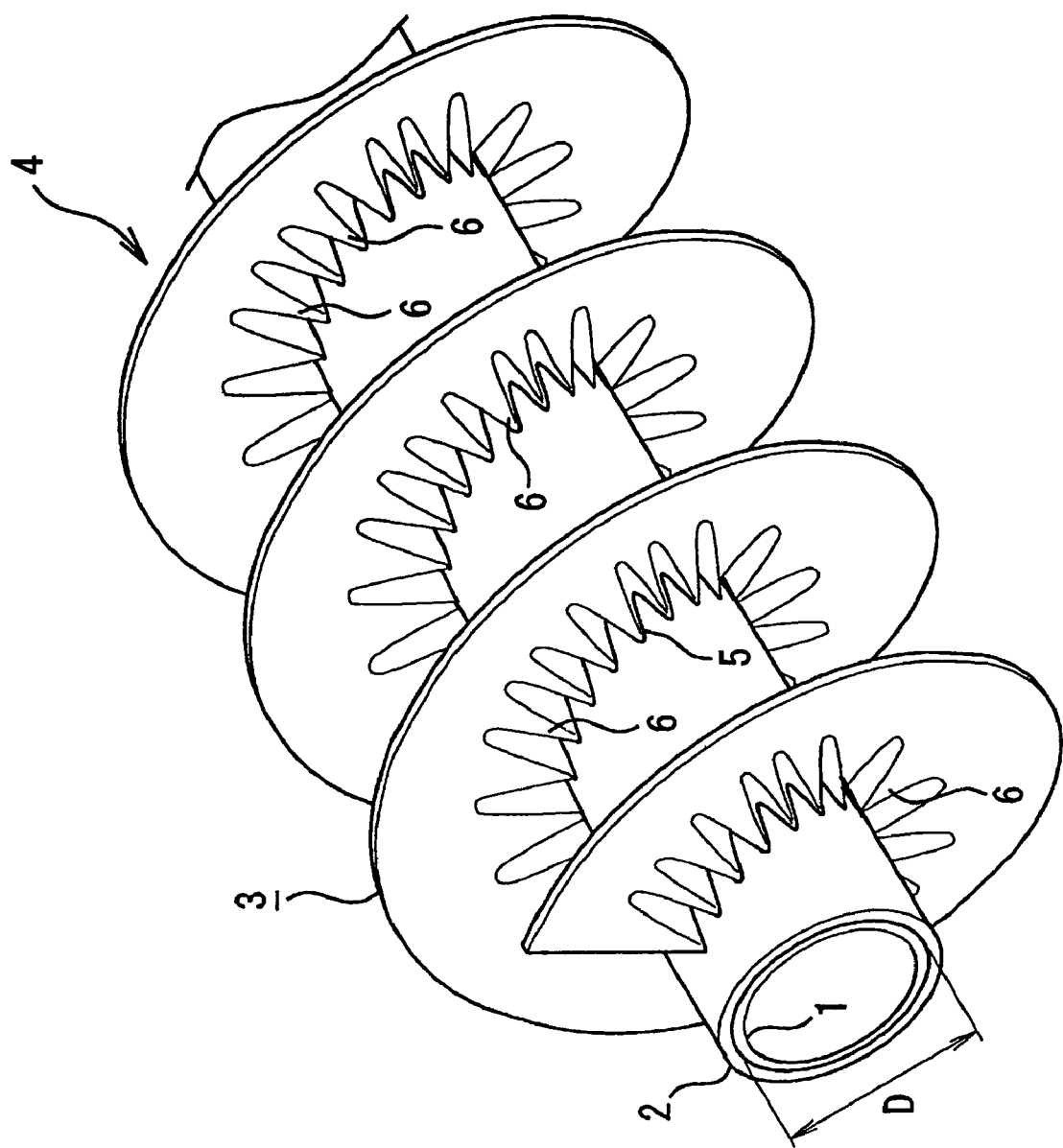
FIG. 1 is a perspective view showing a heat conduction pipe according to the first embodiment of this invention.
Figure 2:
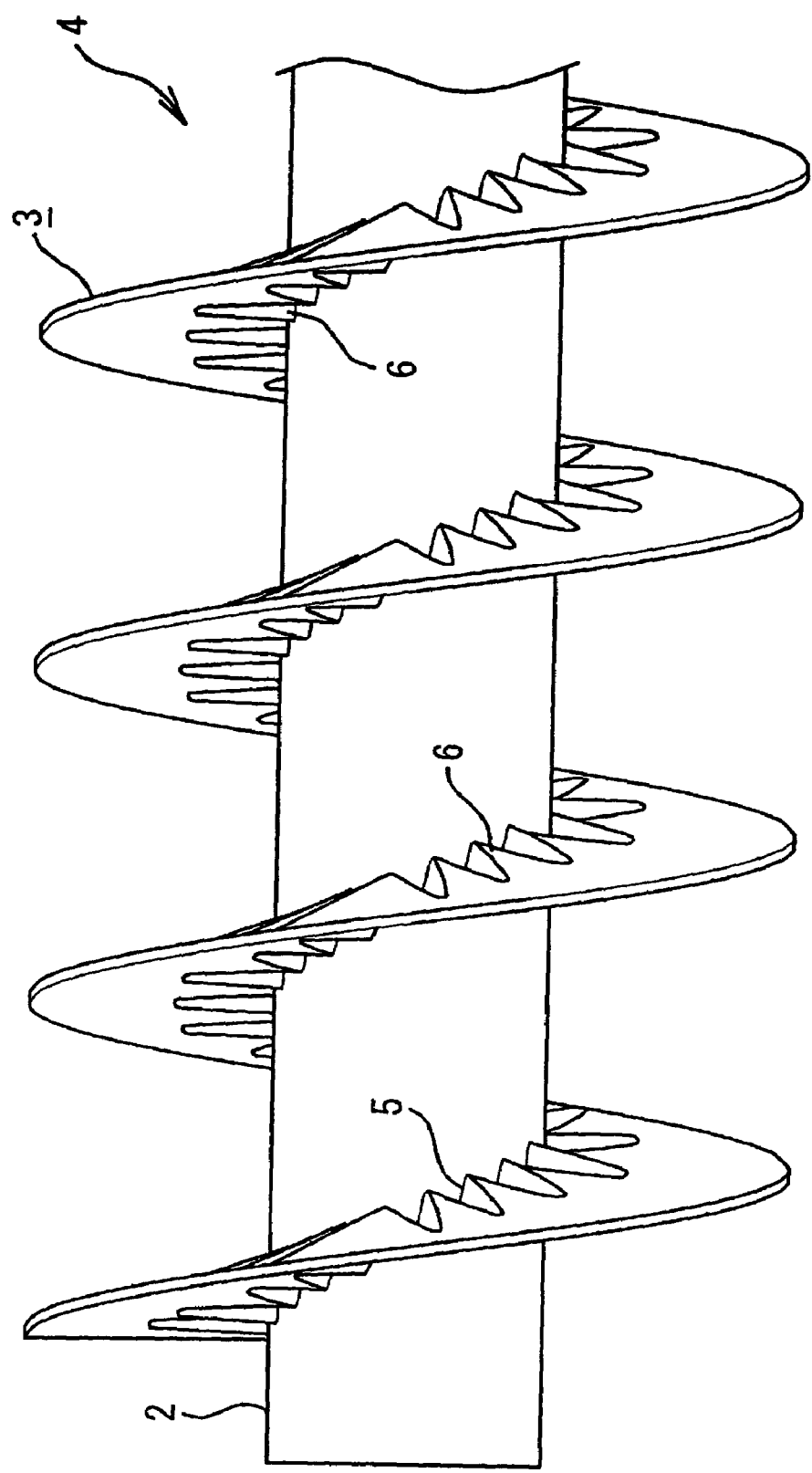
FIG. 2 is a side view of FIG. 1.
Figure 3:
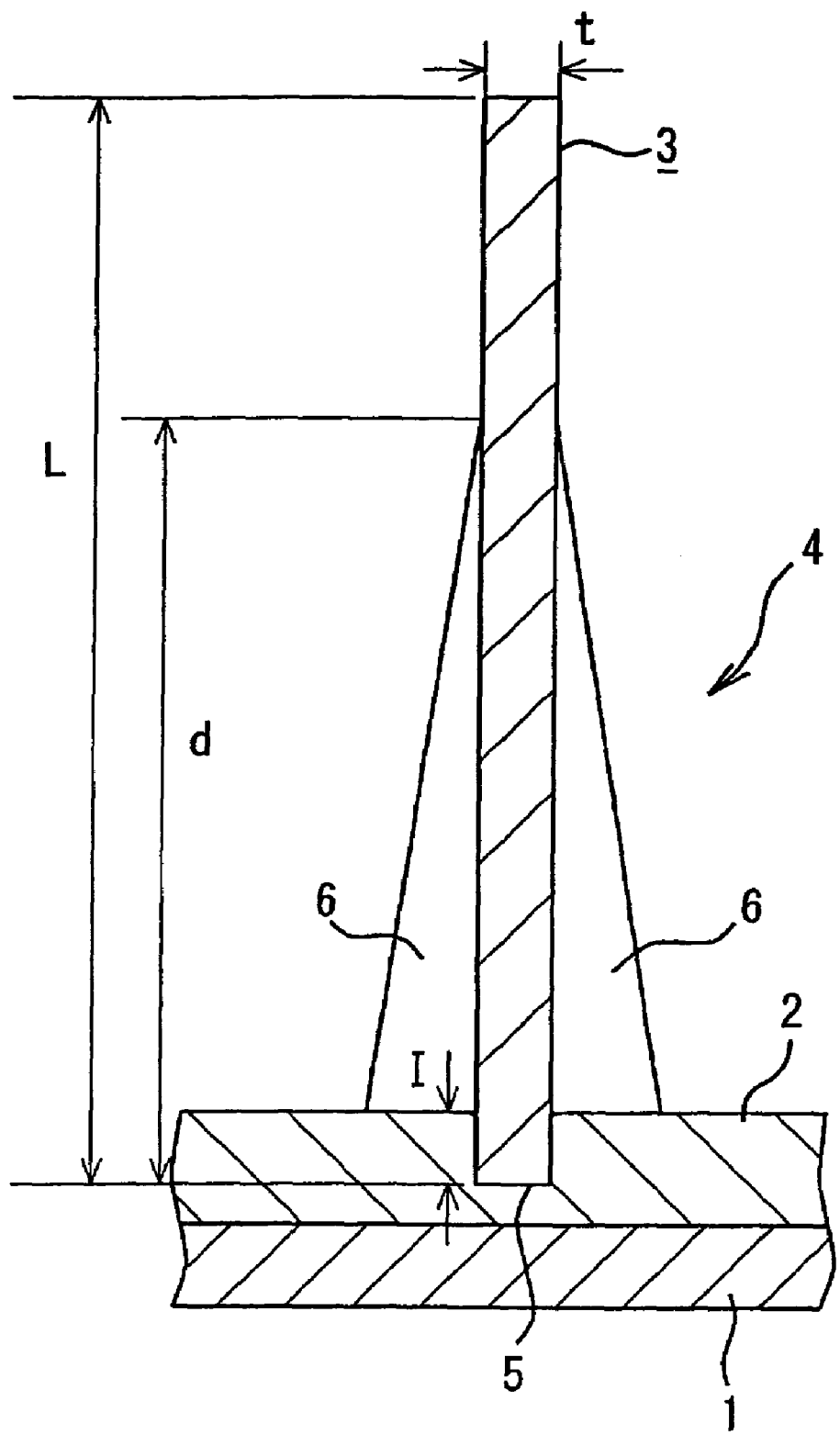
FIG. 3 is a partial enlarged sectional view showing a state where a fin member encroaches a resin coating layer.
Figure 4:
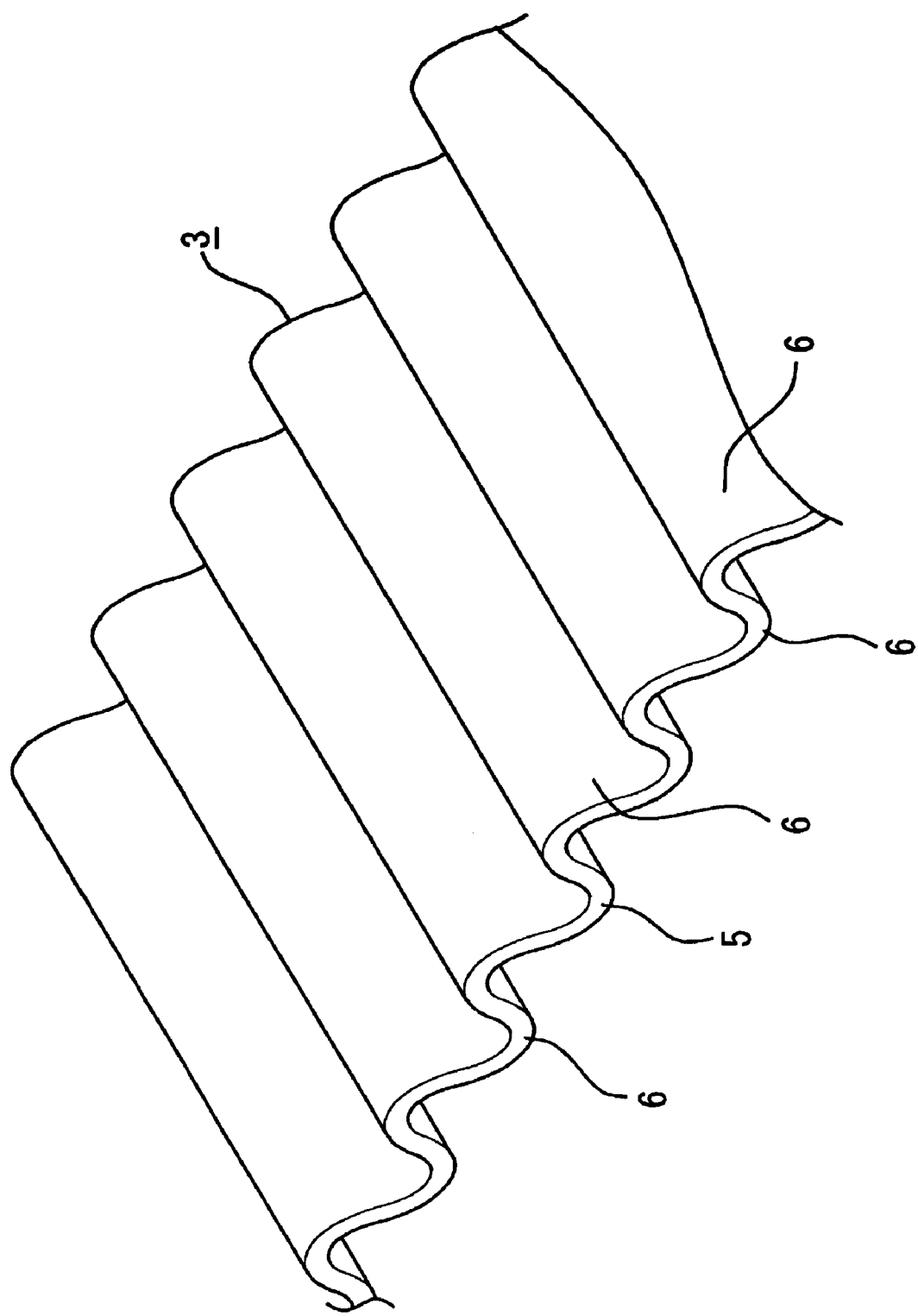
FIG. 4 is a perspective view showing the fin member according to the first embodiment.
Figure 5:
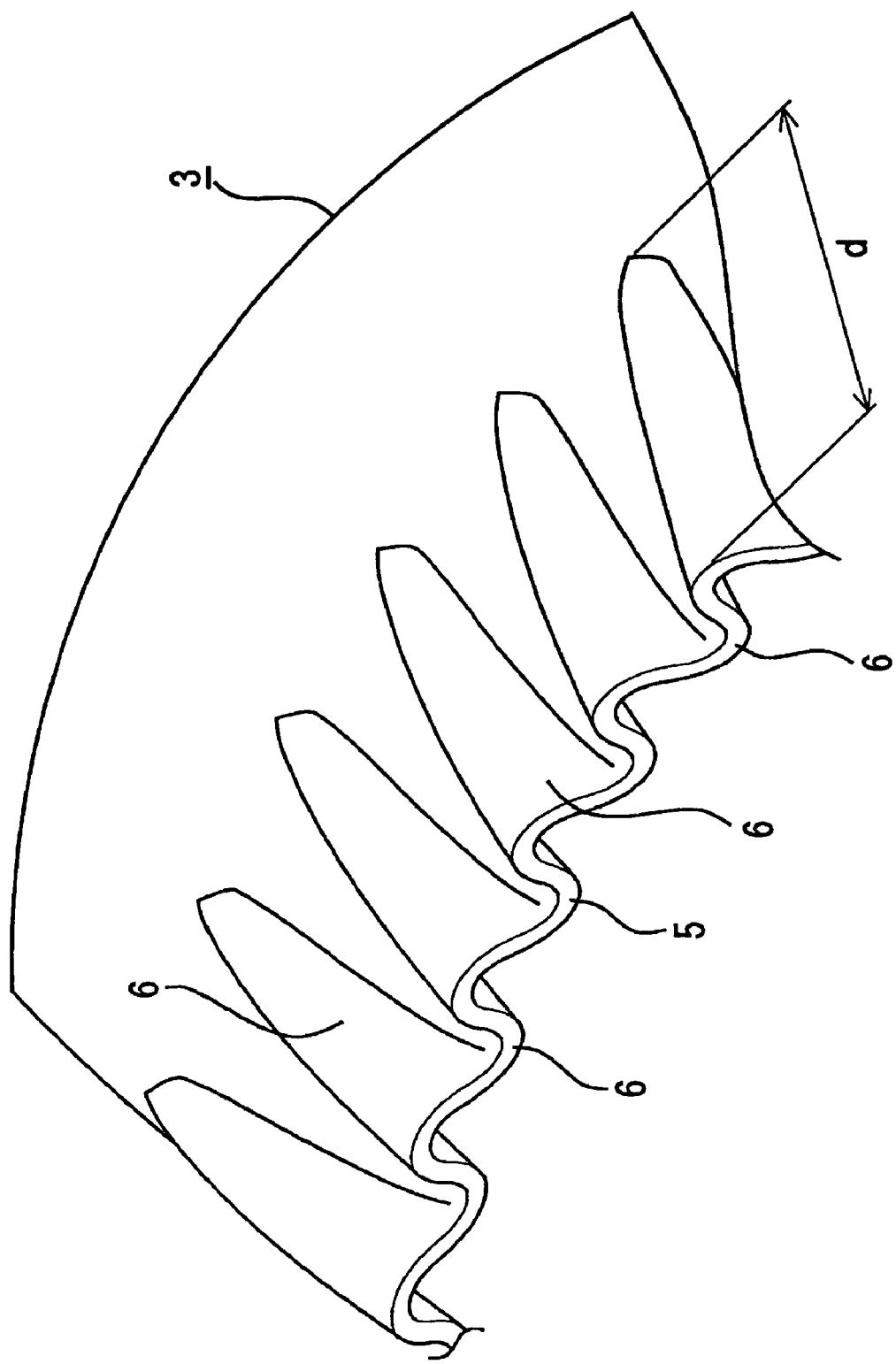
FIG. 5 is a perspective view showing the fin member immediately prior to being formed on the resin coating layer according to the first embodiment.

Hereinafter, embodiments according to this invention will be described in detail with reference to the drawings. FIG. 1 is a perspective view showing a heat conduction pipe according to the first embodiment of this invention, wherein a resin coating layer is formed on an outer circumference of a metal pipe, and a metal fin member in a straight shape having the same cross section from one end to the other end, is spirally formed on an outer circumference of the resin coating layer; FIG. 2 is a side view of FIG. 1; FIG. 3 is a partial enlarged sectional view showing a state where the fin member encroaches the resin coating layer; FIG. 4 is a perspective view showing the fin member according to the first embodiment, wherein the whole fin member is formed in a wave form as to be arranged with wave form edges; and FIG. 5 is a perspective view showing the fin member immediately prior to being formed on the resin coating layer according to the first embodiment, wherein the wave form edges at an inner circumference of the fin member are formed as compressed while the wave form edges at the outer circumference of the fin member are stretched out to make the fin member in an arc shape in a state the fin member is spirally wound on the outer circumference of the resin coating layer.

Figure 6:
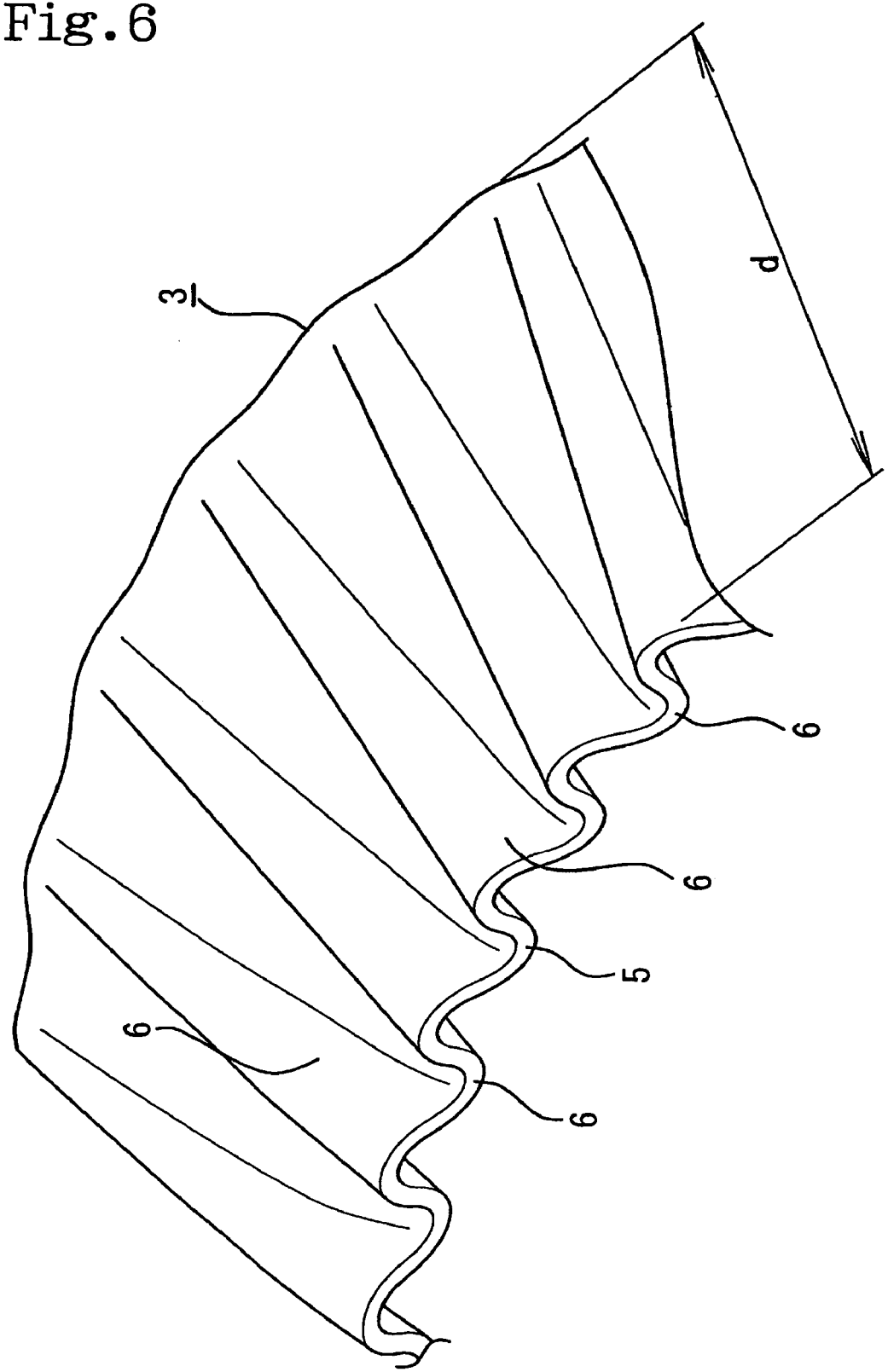
FIG. 6 is a perspective view showing the fin member immediately prior to being formed on the resin coating layer according to the second embodiment.
Figure 7:
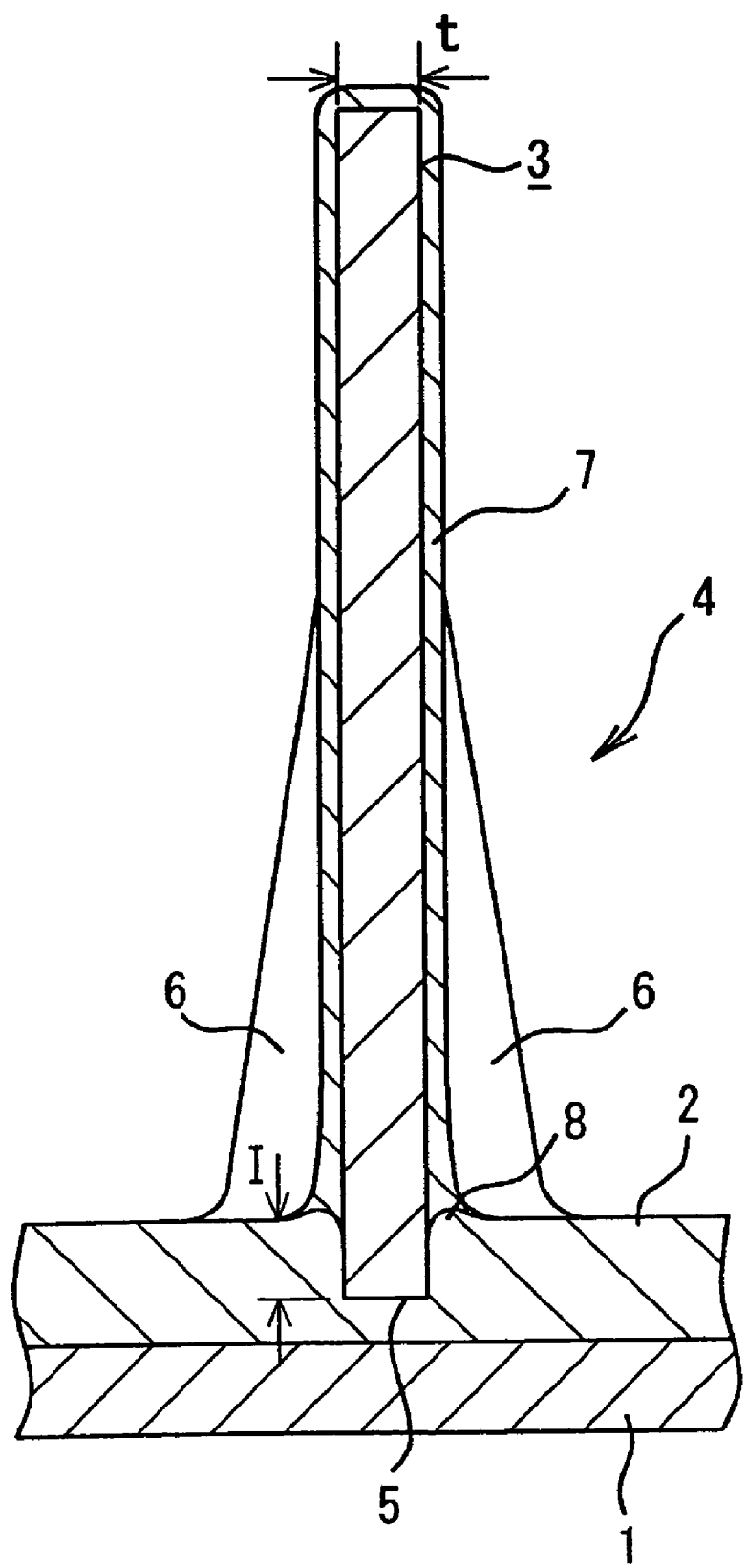
FIG. 7 is a partial enlarged sectional view showing a state where the fin member encroaches the resin coating layer according to the third embodiment.
Figure 8:
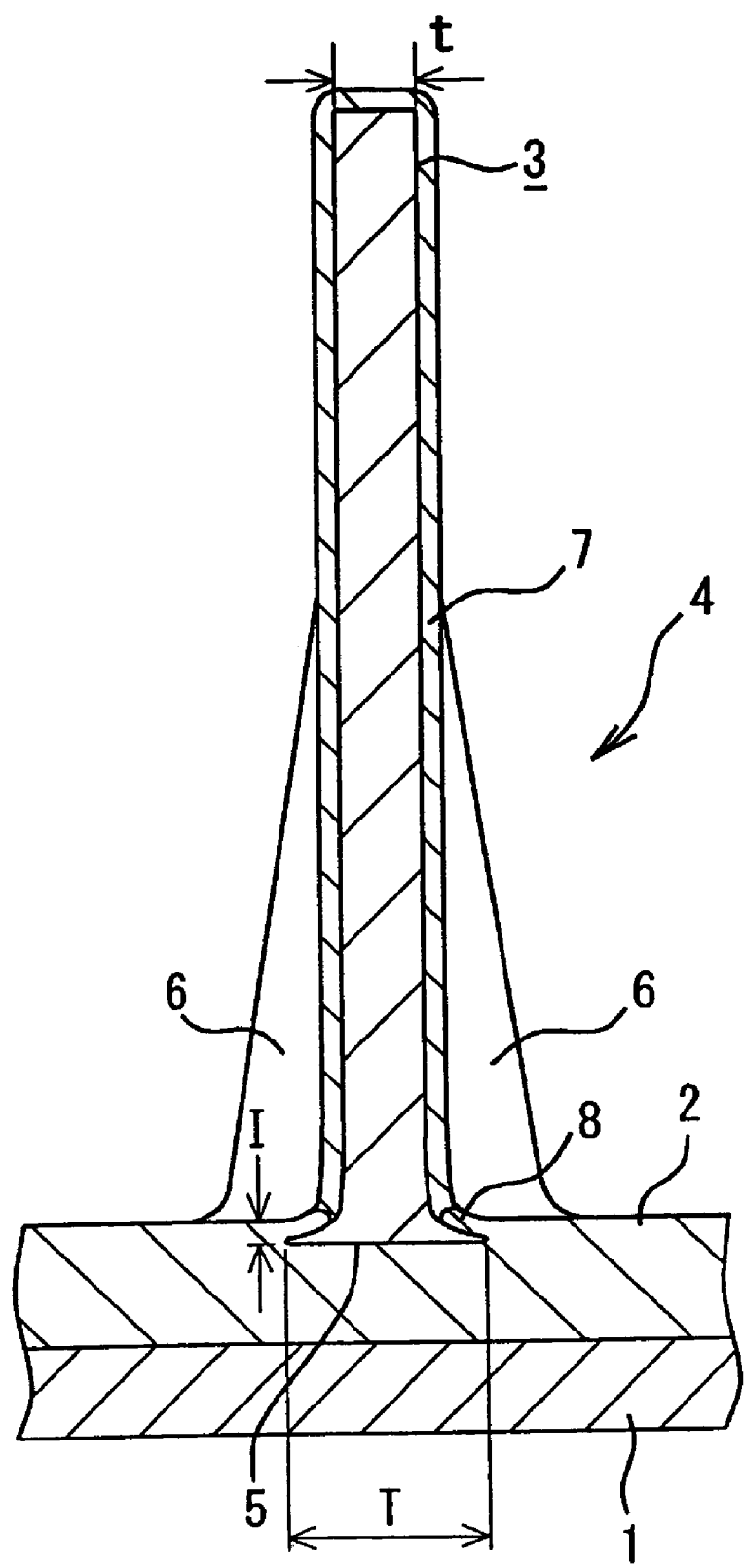
FIG. 8 is a partial enlarged sectional view showing a state where the fin member encroaches the resin coating layer according to the fourth embodiment.
Figure 9:
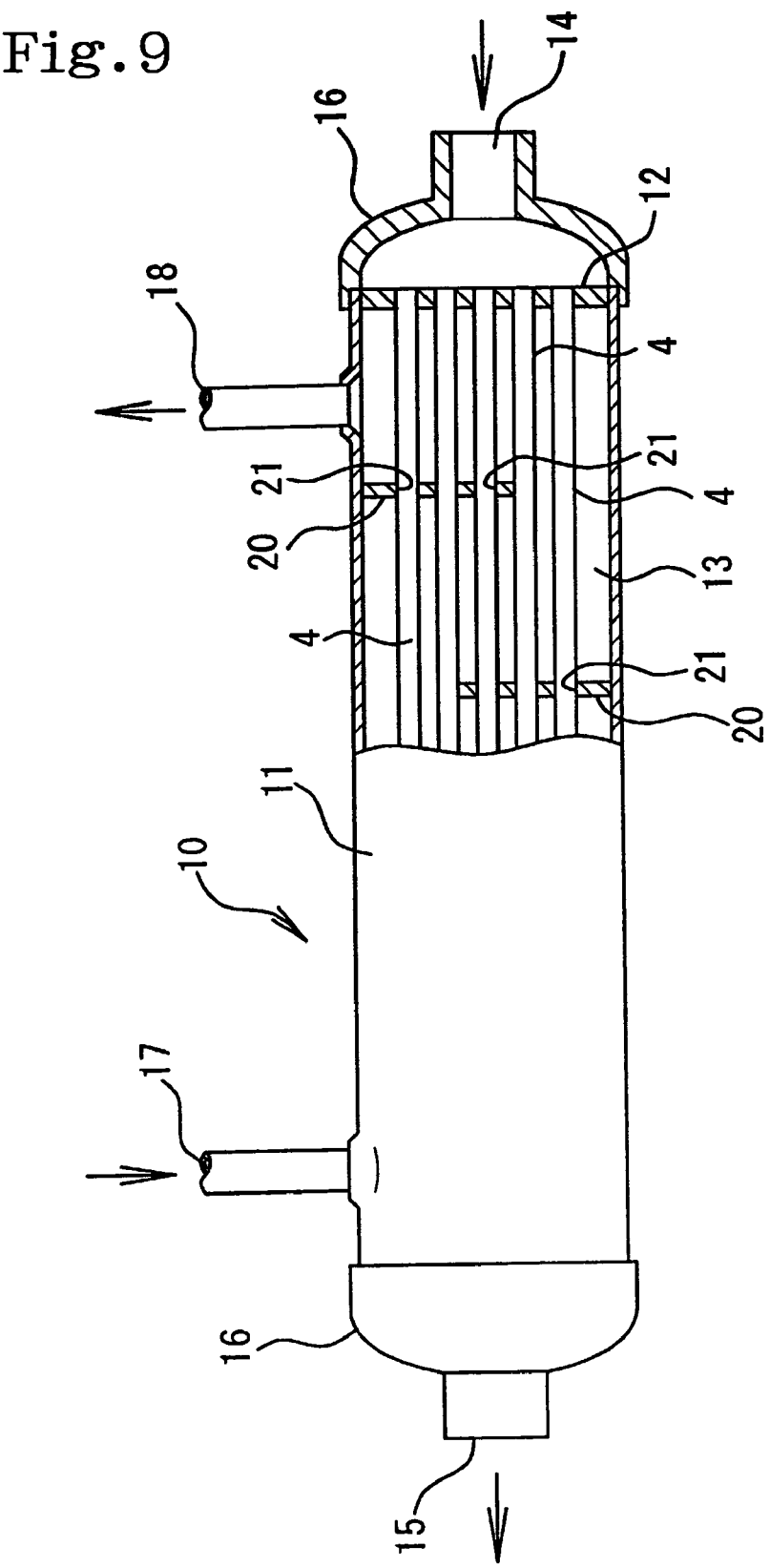
FIG. 9 is a schematic view showing a multi tubular thermal exchanger assembled with the heat conduction pipe of this invention.

FIG. 6 is a perspective view showing the fin member immediately prior to being formed on the resin coating layer according to the second embodiment: wherein the wave form edges at an inner circumference of the fin member are formed as compressed while the wave form edges at the outer circumference of the fin member are expanded circumferentially to make the fin member in the arc shape in a state the fin member. FIG. 7 is a partial enlarged sectional view showing a state where the fin member encroaches the resin coating layer according to the third embodiment, wherein an outer surface of the fin member holds a cathodic electrodeposition coating. FIG. 8 is a partial enlarged sectional view of the heat conduction pipe according to the fourth embodiment, wherein the heat conduction pipe is formed by being externally covered with the fin member having a contact portion width in contact with the resin coating layer wider than a formation width of a body portion of the metal fin member, and the outer surface of the fin member holds the cathodic electrodeposition coating. FIG. 9 is a schematic view showing a multi-tubular thermal exchanger assembled with the heat conduction pipe of this invention.

A metallic material used for the fin member may be any kinds, but the fin member is made to encroach on a part of a thickness of the resin coating layer in being formed on the resin coating layer not to damage the metal pipe in the way the fin member penetrates and breaks the resin coating layer. By forming the fin member of a comparatively soft metallic material, e.g., aluminum, copper, soft steel, or the like, the fin member can wind on the resin coating layer, in a state of encroaching well and having a strong force to wind, without breaking the resin coating layer. Where a comparatively hard metallic material, e.g., stainless or the like is used for the fin member, the fin member is wound on the resin coating layer weakly compared with a case where the soft metallic material is used, so the fin member can encroach without breaking the resin coating layer.

It is preferable to form the thickness of the resin coating layer between 0.1 and 1.0 mm. Where the thickness is thinner than 0.1 mm, the fin member is easily broken by a side end surface of the fin member while the thickness, conversely, is thicker than 1.0 mm, thermal conductivity from an outer circumference surface is decreased.

Where the resin coating layer encroached with the metal fin member is heated and melted at a temperature of 100 to 130% of the melting temperature of the resin coating layer to adhere the fin member to the resin coating layer, the fin member is secured to the resin coating layer more strongly and stably, so that the thermal conductivity between the fin member and the resin coating layer is improved while durability of the fin member to, e.g., fluid pressure of the fluid flowing through an outside, vibration, or the like. It is to be noted that where a-heating temperature is lower than the temperature of 100% of the melting temperature of the resin coating layer, the resin coating layer is not well melted, so contact strength between the fin member and the resin coating layer may not be improved. Where the heating temperature is higher than the temperature of 130% of the melting temperature of the resin coating layer, there is a possibility that the resin coating layer is excessively melted to flow out of a surface of the metal pipe. Therefore, it is preferable to heat at the temperature of 100 to 130% of the melting temperature of the resin coating layer.

By forming either or both of the metal fin member and the metal pipe of an iron material, inexpensive products can be obtained, and furthermore, the durability of each of members can be improved while the shape retention property of the fin member in a spiral state is enhanced, so any buckling hardly occurs.

It is to be noted that either or both of the metal fin member and the metal pipe hold at least one layer of an anticorrosion plating layer on the surface thereof. Especially, in a'state of being formed of the iron material, either or both of the metal fin member and the metal pipe are covered with zinc, tin, nickel, aluminum or alloy based on those metals, so either of both of the metal fin member and the metal pipe can obtain the highly reliable durability.

Where the metal fin member and the metal pipe have a surface on which baking paint is made at a baking temperature of 100 to 130% of the melting temperature of the resin coating layer, the durability thereof can be improved while the resin coating layer is melted to adhere the outer surface of the fin member, so the fin member can be secured strongly to the resin coating layer. In that state, where a temperature is lower than the temperature of 100% of the melting temperature of the resin coating layer, the resin coating layer is not well melted, so improvement of contact strength between the fin member and the resin coating layer can not be intended. Where the baking temperature is higher than the temperature of 130% of the melting temperature of the resin coating layer, there is a possibility that the resin coating layer is excessively melted to flow out of a surface of the metal pipe.

By forming the metal fin member in a straight shape having the same cross section from one end to the other end, the metal fin member can be made to encroach on the resin coating layer. It is preferable to define an encroaching depth of the fin member in the straight shape as 10 to 60% of the resin coating layer's thickness into the resin coating layer so the resin coating layer is not broken by the fin member. Where the encroaching depth is less than 10%, fitness between the resin coating layer and the fin number is worsened, so the thermal conductivity between the fin member and the metal pipe is decreased while connectivity of the fin member with the resin coating layer is weakened. Where the encroaching depth is more than 60%, the resin coating layer as an encroaching portion is weakened, so there is a possibility that the resin coating layer is broken due to a load of the fin member. It is to be noted that where the thickness of the resin coating layer is determined between 0.1 and 1.0 mm as described above, the encroaching depth is determined between 0.01 and 0.6 mm. It is further preferable to determine the encroaching depth as 20 to 40% of the resin coating layer.

Where the metal fin member has a contact portion width in contact with the resin coating layer wider than a formation width of a body portion of the metal fin member and has a cross section in a reversed letter T shape, a contact area between the resin coating layer and the fin member is enlarged, so each other's thermal conductivity can be enhanced while capability of the fin member for securing and stabilizing the resin coating layer can be fastened. It is preferable to form the wide formation width of this contact portion within 200% of the formation width of the body portion. Where the wide formation width of this contact portion is formed winder than 200% of the formation width of the body portion, it is difficult to form the fin member itself as well as to form the contact portion side spirally, so there is a possibility that a gap between the resin coating layer and the fin member occurs.

By making the fin member in the reversed T letter shape like the above, the contact portion having wide surface area is made to encroach on the resin coating layer, so encroaching force is dispersed, and therefore, breaking prevention effect of the resin coating layer becomes high. It is preferable that the fin member in the reversed letter T shape has the encroaching depth into the resin coating layer between 5 and 30% of the thickness of the resin coating layer, and in a case of even the shallow encroaching depth it becomes possible to secure the fin member as stabilized. The encroaching depth is less than 5% of the thickness of the resin coating layer, securing force of the fin member is not improved compared with a case where the fin member is not made to encroach. Where the fin member in the reversed T letter shape is made to encroach more than 30% of the thickness of the resin coating layer, the thermal conductivity does not change while strong winding force is needed, and there is a possibility of breaking the resin coating layer.

By using polyamide (PA), polypropylene (PP), polyethylene (PE), or the like for a resin material used for the resin coating layer, it is possible to obtain the heat conduction pipe superior in corrosion resistance and shock resistance as well as at inexpensive price. It is also possible to obtain the heat conduction pipe superior in not only heat exchange performance and the corrosion resistance but also heat resistance by using the resin material, e.g., monomer-cast nylon, polyamide-imide, polybenzo imidazole, polyether ether ketone, polyether imide, polyether sulphon, polyimide, polyphenylene sulfide, polysulfon, polytetralfluoroethylene, tetrafluoroethylene-perfluoro alkoxyalkane, fluoroethylene-propylene, poly chlorotrifluoroethylene, tetrafluoroethylene-ethylene, ethylene chloro trifluoroethylene, or the like.

The resin materials like the above may include the metallic material, e.g., cupper, aluminum, stainless, or particles or fibers formed of, e.g., carbon material or glass material, and even where the resin material is used, the thermal conductivity of the heat conduction pipe can be enhanced to improve the heat exchange performance thereof. It is preferable to use the resin material as a black color having black-body radiant effect, and the black resin material having the black-body radiant effect may further include, e.g., the particles or the fibers, and furthermore, in a case of heat radiation, the resin material like the above is superior in, with respect to radiation heat, heat radiation property while in a case of heat endothermic property, the resin material like the above is superior in heat absorption, so the heat exchange efficiency of the heat conduction pipe can be further improved.

By making the resin material include carbon nano-fibers, e.g., carbon nano-tube, carbon nano-horn, the thermal conductivity of the resin material is effectively enhanced, so the heat radiate and endothermic characteristics of the heat conduction pipe can be further improved. It is to be noted that the above described carbon nano-fibers are contained in an amount more than 5 wt % and less than 30 wt %, so that better thermal conduction effect can be obtained while it is easy to produce the heat conduction pipe.

Where content of the carbon nano-fibers is less than 5 wt %, action on the improvement of the thermal conduction effect becomes poor. Where the content is more than 30 wt %, the thermal conduction effect does not change so much while it is difficult to make the resin material include the carbon nano-fibers in an amount more than 30 wt %, so the productivity is decreased and the products become expensive. It is to be noted that the carbon nano-fiber described herein indicates a generic term including carbon nano-tube, carbon nano-horn, other nano-size carbon fibers. The resin material may include mixing of carbon nano-tube, carbon nano-horn, and others or simple substance. Where the resin material includes carbon nano-tube, carbon nano-tube may be of single layer or a plurality of the layers. An aspect ratio of carbon nano-tube is not considered. Furthermore, neither thickness nor length of carbon nano-tube is considered.

DETAILED DESCRIPTION OF PREFERRED EMBODIMENTS OF THE INVENTION

First Embodiment

The first embodiment shown in FIG. 1 to FIG. 4 is described in detail. Numeral 1 is a metal pipe using, e.g., a single-wound pipe having an outer surface not covered with copper, a double-wound pipe having the outer surface covered with the copper, an aluminum pipe, or the like, wherein an outer diameter is defined as 8 mm and thickness is defined as 0.7 mm. The metal pipe 1 can obtain corrosive resistance by being covered with a resin coating layer 2 as described hereinafter, so the metal pipe can be directly used. In this embodiment, however, sacrificially corrosive anticorrosion plating (not shown in Figures) is further formed on the outer surface of the metal pipe, so the great corrosion resistance can be obtained under harsh corrosive environment.

The anticorrosion plating is formed of one layer by coating, e.g., zinc, tin, alloy of tin and zinc, nickel, alloy of zinc and nickel, alloy of zinc and aluminum, or may be structured of a plurality of the layers, e.g., two layers by coating nickel on the outer surface of the metal pipe 1 and further coating the alloy of zinc and nickel on an outer circumference of the nickel. In a case of a plurality of the anticorrosion plating, a method as described in Japanese Patent Nos. JB-2750710 and JB-2954555, and Japanese Patent Application Publication No. JA-3-47987, can be used for forming the anticorrosion plating. The metal pipe 1 may obtain the corrosion resistance by holding zinc plating and chromate film.

With using an extrusion apparatus, subsequently, the resin coating layer 2 with the thickness between 0.1 and 1.0 mm is coated as adhered on the outer circumference of the anticorrosion plating. The resin coating layer 2 is formed of only single layer, polyamide 12, e.g., polyamide (PA), polypropylene (PP), polyethylene (PE), or the like. With the resin coating layer 2, the metallic material, e.g., copper, aluminum, stainless, or particles or fibers formed of, e.g., carbon material or glass material may be included inside, or the resin material as a black color having black-body radiant effect may be used while carbon nano-fibers may be included, and therefore, in a case of heat radiation, the resin material like the above is superior in, with respect to radiation heat, heat radiation property while in a case of heat endothermic property, the resin material like the above is superior in heat absorption, so the thermal conductivity of the resin coating layer 2 can be enhanced.

As shown in FIG. 3, a long fin member formed of a metal plate made of, such as, aluminum, copper, surface-treated soft steel, or stainless steel, is spirally formed on the outer circumference of the resin coating layer 2 with one end side surface of the fin member 3 in contact with the resin coating layer 2, so a heat conduction pipe 4 according to the first embodiment can be obtained. It is to be noted that, with the fin member 3, a formation length L in width direction is between 50 and 150% of an outer diameter D of the metal pipe 1 as shown in FIG. 1, and a thickness T is formed between 0.15 and 0.4 mm. The anticorrosion plating may be formed on a surface of the fin member 3 like the metal pipe 1, and may be formed of one layer of, e.g., zinc, tin, alloy of tin and zinc, nickel, alloy of zinc and nickel, alloy of zinc and aluminum, or may be of a plurality of the layers alloy based on those metals. By forming the anticorrosion plating like the above, the fin member 3 can be prevented from corroding, so the corrosion resistance of the whole heat conduction pipe 4 can be enhanced.

To form the fin member 3 spirally on the resin coating layer 2, in the first embodiment, the fin member 3 in a straight shape having the uniform thickness and the same cross section from one end to the other end is formed with wave form edges over the whole width, so the whole fin member 3 is formed in a wave form as a whole. As shown in FIG. 5, immediately before the fin member 3 is formed on the metal pipe 1, an inner circumferential side as a contact portion of the heat conduction pipe 3 to the resin coating layer 2 is radially reduced to enlarge an undulation of the wave form edges while an outer circumferential side is formed as expanded flatly. According to the above described formation, difference in diameter between an inside diameter side and an outside diameter side occurs, so the fin member 3 curves in an arc shape with the contact portion 5 side as the inside to easily wind on the outer circumference of the metal pipe 1 covered with the resin coating layer 2. It is to be noted that after forming spirally the fin member 3 on the metal pipe 1 is completed, the wave form edges 6 are formed so the formation length d of the wave form edges 6 of fin member 3 as shown in FIG. 3, is length of more than 50% of the formation width of the fin member 3.

The fin member 3 is then wound spirally in a state where the contact portion 5 is made to encroach on the surface of the resin coating layer 2. In this embodiment, an encroaching depth (I in FIG. 3) of the contact portion 5 of the fin member 3 into the resin coating layer 2 is determined as 60% of the resin coating layer 2's thickness. The fin member 3 is, like the above, wound in a state where the contact portion 5 thereof is made to encroach the resin coating surface 2, so the contact portion 5 is bound by the resin coating layer 2 to prevent the fin member 3 from buckling due to a resilience of a metallic material, whereas operation for forming the fin member 3 spirally can be effectively made.

The contact portion 5 having the wave form edges 6 is made to encroach the rein coating layer 2, so contact area between the contact portion 5 and the resin coating layer is enlarged compared with a case of encroaching linearly while the contact portion 5 is arranged in a direction intersecting with a buckling direction of the fin member 3. The fin member 3, therefore, encroaches the resin coating layer 2 further strongly to strengthen binding force, so prevention effect for buckling can be enhanced.

The buckling of the fin member conventionally causes a gap on the contact portion between the metal pipe and the fin member, so the gap needs to be blocked by, e.g., coating or brazing. In this invention, however, fitness between the resin coating layer 2 and the fin member 3 is so strong to result in adhesion without the gap, so it is not necessary to make the operation for plugging the gap, whereas operating efficiency while products superior in the corrosion resistance can be obtained.

With the heat conduction pipe 4 as structured like the above, the metal pipe 1 is covered as protected with the resin coating layer 2 having shock absorption, water resistance, chemical resistance, or the like, so it is possible to enhance the prevention effect of the metal pipe 1 and the anticorrosion plating covering the surface thereof for damages due to, e.g., bounding stones, or oxidizing due to, e.g., mud. In this embodiment, furthermore, the products superior in the corrosion resistance can be obtained because the anticorrosion plating is formed on the fin member 3 as well.

The metal fin member 3 is formed on the outer circumferential surface of the resin coating layer to enlarge heat exchange area while one end side surface of the fin member 3 is made to encroach the resin coating layer 2 as adhered without the gap to obtain the great thermal conductivity through the resin coating layer 2 between the metal pipe 1 and the fin member 3. When needed, the resin coating layer 2 is made to include carbon nano-fibers, or particles or fibers of, e.g., carbon material or glass material, or use the resin material as a black color having black-body radiant effect, so the thermal conductivity of the resin coating layer 2 can be enhanced also, whereas the thermal conductivity between the metal pipe 1 and the fin member 3 can be further improved.

Heat radiation property and endothermic property of the heat conduction pipe 4, therefore, can be improved, so heat exchange between fluid flowing through the interior and the exterior of the heat conduction pipe 4 respectively, can be performed. Durability of the fitness for the vibration of the heat conduction pipe 4 or fluid pressure of the fluid flowing through the outer circumference of the fin member, so good heat exchange performance can be obtained.

With a multi tubular thermal exchanger 10 assembled with the heat conduction pipe 4 like the above, as shown in FIG. 9, a pair of tube sheets 12 is connected to each side of a body pipe 11 in a tubular shape, so the inside of the body pipe 11 can be sealed. Between a pair of the tube sheets 12, a plurality of the heat conduction pipes 4 according to this embodiment is arranged as connected in a state where the heat conduction pipes 4 penetrates the tube sheets 12. Bonnets 16 respectively having a fluid inlet 14 and a fluid outlet for high temperature thermal medium fluid subject to be cooled are connected to both end sides.

By forming a coolant inlet 17 and a coolant outlet 18 on the outer circumference of the body pipe 11, the inside of air tight space closed off by a pair of the tube sheets is made to be a coolant portion 13. A plurality of support plate 20 is arranged as bonded to the inside of the coolant portion 13, and a penetration whole 21 formed on the support plate 20 is made to penetrate the heat conduction pipe 4, so the support plate 20, as a baffle plate, supports the heat conduction pipe stably as well as renders a flow of the low temperature thermal medium fluid flowing through the inside of the coolant portion 13 meander.

With the above described multi tubular thermal exchanger 10, where the high temperature thermal medium fluid is introduced through the fluid inlet 14 into the body pipe 11, the high temperature thermal medium fluid flows into a plurality of the heat conduction pipe 4 formed inside the body pipe 11. Inside the coolant portion 13 arranged with the heat conduction pipes 4, the low temperature thermal medium fluid previously flows through the outsides of the heat conduction pipes 4, the heat exchange between high temperature thermal medium fluid and the low temperature thermal medium fluid is performed through the outer surfaces of the heat conduction pipes 4.

With the heat conduction pipe 4, the exchange area is enlarged by forming the fin member 3 as described above while the thermal conductivity between the fin member 3 and the metal pipe 1 is enhanced by enhancing fitness between the fin member 3 and the resin coating layer 2. The fin member 3, furthermore, is formed spirally, so the low temperature thermal medium fluid is changed into a turbulent flow or an agitated effect occurs, whereas the heat exchange can be promoted because of separation of the boundary layer. Changing the low temperature thermal medium fluid into the turbulent flow or agitation is promoted by forming the wave form edges 6 on the fin member 3. By actions as described above, heat of the high temperature thermal medium fluid flowing through the inside of the metal pipe 1 effectively radiates through the fin member 3 to the low temperature thermal medium fluid flowing through the outside, whereas great cooling effect for the high temperature thermal medium fluid can be obtained.

In the above described first embodiment, the heat conduction pipe 4 of this invention is used for the multi tubular thermal exchanger 10, however, the heat conduction pipe 4 of this invention can be used for, e.g., fuel pipes formed under floor. The heat of the fuel flowing through the inside radiates effectively by contacting air flowing through the outer circumference of the fuel pipe, so the great cooling effect can be obtained.

By using the heat conduction pipe 4, as described above, quality of, e.g., the multi tubular thermal exchanger 10, fluid cooling pipes of automobiles and construction machines, air conditioners for regulating temperature and humidity of residential space can be improved. Because the heat exchange performance can be obtained, it becomes possible to make these products like the above compact, so the products have great layout freedom to be placed in small places.

In the first embodiment, the anticorrosion plating layer is formed on the outer surface of the metal pipe 1 and the fin member 3, however, not only a plating processing but also other surface processing, e.g., a anodic oxidation processing may be made. Operation for surface processing of, e.g., the plating processing, the anodic oxidation processing, or the like may be incorporated into manufacturing process, however, a metallic plate or the like, wherein the surface processing like the above is previously made, used for the metal pipe 1 having a thin diameter or the fin member 3 may be used, so productivity of the heat conduction pipe 4 can be further enhanced with avoiding a trouble of making the surface processing.

Second Embodiment

In the above described first embodiment, immediately before the fin member 3 holding wave form edges over the whole width is formed on the metal pipe, in order to make spiral winding of the fin member on the outer circumference of the metal pipe 1 easy, the inner circumferential side is radially reduced to enlarge the undulation of the wave form edges 6 while the wave form edges 6 are expanded flatly at the outer circumferential side, so the fin member 3 is curved in an arc shape. In the second embodiment, on the other hand, as shown in FIG. 6, in a state where the fin member 3 holding a plurality of the wave form edges 6 over the whole wide is spirally wound on the metal pipe 1, the undulation of the wave form edges 6 is enlarged by shrinking the inner circumferential side while at the outer circumferential side, as shown in FIG. 6, the wave form edges 6 stay as just opened without being expanded flatly, so the wave form edges is formed at the outer circumferential side in a state where the wave form remains though becomes smaller.

By forming the heat conduction pipe 4 with the process like the above, after the fin member 3 is formed on the metal pipe 1, the wave form edges 6 are formed on the whole fin member 3 in a width direction, the fin member 3 can be spirally with ease without expanding flatly the outer circumferential side. Furthermore, surface area of the fin member 3 is enlarged, so the heat exchange performance of the heat conduction pipe 4 can be enhanced.

In the above described first and second embodiments, in a state where the fin member 3 holding the wave form edges 6 over the whole width is spirally wound on the metal pipe 1, the inner circumferential side is radially reduced to enlarge the undulation of the wave form edges 6 while at the outer circumferential side, the wave form edges 6 are expanded flatly as shown in FIG. 5, or expanded circumferentially as shown in FIG. 6, so the fin member 3 is formed in the arc shape as curved and formed spirally on the outer circumference of the metal pipe 1.

To the contrary, as another embodiment, the fin member 3 can be formed, as shown in FIG. 5, by using a flat fin member 3 having no wave form edge and forming wave form edges 6 only on the inner side as reducing the inner side of the fin member 3 when wound around the metal pipe 1. Alternatively, as shown in FIG. 6, the fin member 3 can be formed in an arc shape in ensuring the wave form edges 6 extending over the whole width and differentiating the diameters of the inner side and the outer side, by winding the fin member 3 as forming the wave form edges 6 over the fin member 3, by reducing diameter on the inner side of the fin member 3 when the wave form edges 6 are formed, and by enhancing the undulation of the wave form edges 6 on the inner side whereas rendering gentle the undulation of the wave form edges 6 on the outer side.

In the first embodiment, the formation length d of the wave form edge 6 is of a length about 50% of the formation width of the fin member 3, but in the second embodiment, the formation length d of the wave form edge 6 is of a length of 100% of the formation width of the fin member 3. Thus, where the formation length d of the wave form edge 6 is of a length of 50% to 100% of the formation width of the fin member 3, the fin member 3 can be easily wound in the spiral form on the resin coating layer 2 arranged on the outer peripheral surface of the metal pipe 1, and the heat conduction pipe 4 can be assembled with good attachment between the resin coating layer 2 and the fin member 3 and with improved heat conductivity.

Third Embodiment

In the embodiment 3 shown in the FIG. 7, cathodic electrodeposition coating is arranged on the whole external surface of the heat conduction pipe. The process of manufacturing the heat conduction pipe 4 is first subject to zinc based plating on the outer circumference of the metal pipe 1 made of iron to enhance the corrosion resistance, and after arranging an epoxy resin on the outer circumference as a primer, a PA is extruded on the outer circumference of the epoxy resin to form the resin coating layer 2. The heat conduction pipe 4 is-formed by spirally arranging the metal fin member 3 with zinc based plating to enhance the corrosion resistance on the outer circumference of the metal pipe 1 having the resin coating layer 2. The spiral arrangement of the fin member 3 may be arranged by tensioning the outer circumference side as shown in the First embodiment in the FIG. 5 when the fine member 3 formed with the wave form edges 6 across whole width as shown in the FIG. 4 to the metal pipe 1 is wound around the metal pipe 1, or may be arranged by keeping the wave form edges 6 across whole width by spreading the outer circumference of the wave form edges 6 as shown in the Second Embodiment in the FIG. 6. The member may be spirally arranged on the outer circumference of the metal pipe 1 by setting the wave form edges 6 using the flat fin member 3 having no wave form edge 6 only in the inner circumference as shown in the FIG. 5 or by setting the wave form edges 6 which across whole width as shown in the FIG. 6.

A paint portion 7 is formed on outer circumferential surface of the heat conduction pipe 4 thus formed by making a painting with resin paint. The metal fin member 3 or the like has a higher corrosion resistance by covering the member with the paint portion 7 of the resin based material, thereby improving the durability of the heat conduction pipe 4. It is to be noted that this coating can be any publicly known coating methods such as powder coating, electrostatic coating, dipping coating, and so on, but when powder coating is done, for example, resin based coating paint may attach not only on the fin member 3 but also on the surface of the resin coating layer 2. Therefore the resin coating layer 2 becomes thickly formed and there is a possibility that thermal conductivity declines a little.

So as not to happen this disadvantage, cathodic electrodeposition coating is adopted in the Third Embodiment and to arrange more effective coating, aforesaid arrangement is done twice. In this case, only metal fin member 3 made of iron is built up with charges and absorbs the coating, and the paint portion 7 is formed on the external surface of the member 3 but resin coating layer 2 never be coated. Therefore: the metal fin member 3 is able to obtain better corrosion resistance and to keep better heat conductance of heat conduction pipe 4. At a time of a coating of cathodic electrodeposition in this embodiment, baking temperature is 190 degrees and the melting temperature of the resin coating layer 2 made of the polyamide is 150 degrees, so that the baking temperature is 126% of the melting temperature. Therefore the polyamide on the resin coating layer 2 melts at the same time as baked and adheres on the external surface of the fin member 3 encroaching into the resin coating layer 2, and as shown in FIG. 7, a melting adhering portion 8 is formed to secure strongly the fin member 3 to the resin coating layer 2, thereby enhancing the stability of the fin member 3. As shown in the FIG. 7, each boundary part of the melting adhering portion 8, and the coating portion 7 of the metal fin member 3 and the resin coating layer 2 become unified smoothly to enhance each heat conduction property mutually and to improve adhering stability of the fin member 3.

Fourth Embodiment

In the First to Third Embodiments as above mentioned, the straight form fin member 3 whose cross section is the same width from side end to another is used, and in this Fourth Embodiment shown in the FIG. 8, used is the fin member 3 having a formation width T of the contact portion 5 contacting to the resin coating layer 2, which is broadly formed within 200% of the formation width t of the main body, and having a cross section in a form of a reversed letter T. The fin member 3 is spirally arranged on the external surface of the resin coating layer 2, as this broadened contact portion 5 is made encroaching into the resin coating layer 2. With this structure, the contact area of the resin coating layer 2 and the fin member 3 becomes larger, thereby enhancing the heat conduction of both and thereby improving the adhering stability of the fin member 3 to resin coating layer 2. By broadening the contact portion 5 as mentioned above, encroaching force to the resin coating layer 2 may be dissipated, so that the breaking down prevention effect of the resin coating layer 2 can be enhanced.

In the Fourth Embodiment, also by cathodic electrodeposition coating, coating portion 7 is formed on the outer circumference of the fin member 3 to enhance the corrosion resistance, to perform adhering between the resin coating layer 2 and the fin member 3, and to unify smoothly the resin coating layer 2 and the coating portion 7. Therefore mutual heat conduction among the resin coating layer 2, the fin member 3 and the coating portion 7 is made higher, and the adhering stability of the fin member 3 to the resin coating layer 2 is improved. Furthermore, by broadening the side of the contact portion 5 of the fin member 3 to the resin coating layer 2, the fin member 3 is strongly secured by the melting adhering portion 8, thereby increasing durability against impact. Therefore, the heat conduction pipe 4 is obtainable with good durability and good heat exchange property.

In a case of the heat conduction pipe 4 with no coating as the First and Second embodiments, by heating at the temperature of 100 to 130% of the a melting temperature of the resin coating layer 2, resin coating layer 2 can melt and render the resin coating layer 2 thickly adhere as melted to the outer circumference of the fin member 3 encroaching the resin coating layer 2. Therefore the fin member 3 can be strongly secured to the resin coating layer 2, and the mutual heat conduction is enhanced to further improve the heat exchange property of the heat conduction pipe 4, to bring a better buckling prevention effect of the fin member 3, and to improve the qualities of the heat conduction pipes 4 structured as the First and Second Embodiments.

What is claimed is:

1. A heat conduction pipe externally covered with a fin member comprising:
   a metal pipe;
   at least a single resin coating layer formed on an outer circumferential surface of the metal pipe; and
   a metal fin member wound spirally on an outer circumferential surface of the resin coating layer, the metal fin member having a side end surface, serving as a winding contact portion, in contact with the outer circumferential surface of the resin coating layer, the winding contact portion encroaching a surface of the resin coating layer to an encroaching depth of 10 to 60% of a thickness of said resin coating layer.

2. The heat conduction pipe externally covered with the fin member according to claim 1, wherein the metal fin member has the side end surface formed in a wave form to encroach the resin coating layer.

3. A heat conduction pipe externally covered with a fin member comprising:
   a metal pipe;
   at least a single resin coating layer formed on an outer circumferential surface of the metal pipe; and
   a metal fin member wound spirally on an outer circumferential surface of the resin coating layer, the metal fin member having a side end surface, serving as a winding contact portion, in contact with the outer circumferential surface of the resin coating layer, the winding contact portion encroaching a surface of the resin coating layer, wherein the resin coating layer has a thickness between 0.1 and 1.0 mm.

4. The heat conduction pipe externally covered with the fin member according to claim 1 or 2, wherein either or both of the metal fin member and the metal pipe are formed of an iron material.

5. The heat conduction pipe externally covered with the fin member according to claim 1 or 2, wherein either or both of the metal fin member and the metal pipe hold at least one layer of an anticorrosion plating layer on the surface thereof.

6. The heat conduction pipe externally covered with the fin member according to claim 1 or 2, wherein either or both of the metal fin member and the metal pipe are covered with zinc, tin, nickel, aluminum or alloy based on those metals.

7. The heat conduction pipe externally covered with the fin member according to claim 1 or 2, wherein the metal fin member has a constant thickness from the side end surface in contact with the resin coating to a side end surface opposite said side end surface in contact with the resin coating.

8. The heat conduction pipe externally covered with the fin member according to claim 7, wherein the fin member has an encroaching depth of 20 to 40% of the resin coating layer's thickness into the resin coating layer.

9. The heat conduction pipe externally covered with the fin member according to claim 1 or 2, wherein the metal fin member has a contact portion width in contact with the resin coating layer wider than a formation width of a body portion of the metal fin member and has a cross section in a reversed letter T shape, and wherein the formation width of this contact portion is within 200% of the formation width of the body portion.

10. The heat conduction pipe externally covered with the fin member according to claim 9, wherein the fin member in the reversed letter T shape has the encroaching depth into the resin coating layer between 10 and 30% of the thickness of the resin coating layer.

11. The heat conduction pipe externally covered with the fin member according to claim 1 or 2, wherein the resin coating layer has a resin material including either or both of particles and fibers having a higher heat conductivity than that of the resin material forming the resin coating layer, wherein said particles and fibers comprise carbon material or glass material.

12. A heat conduction pipe externally covered with a fin member comprising:
a metal pipe;
at least a single resin coating layer formed on an outer circumferential surface of the metal pipe; and
a metal fin member wound spirally on an outer circumferential surface of the resin coating layer, the metal fin member having a side end surface, serving as a winding contact portion, in contact with the outer circumferential surface of the resin coating layer, the winding contact portion encroaching a surface of the resin coating layer, wherein the resin coating layer contains carbon nano-fibers in the resin material forming the resin coating layer.

13. The heat conduction pipe externally covered with the fin member according to claim 12, wherein the carbon nano-fibers are contained in an amount more than 5 wt % and less than 30 wt %.

14. The heat conduction pipe externally covered with the fin member according to claim 1 or 2, wherein the resin coating layer is formed of two layers on outer circumferential surface of the metal pipe.

15. The heat conduction pipe externally covered with the fin member according to claim 3, wherein the metal fin member has the side end surface formed in a wave form to encroach the resin coating layer.

16. The heat conduction pipe externally covered with the fin member according to claim 12, wherein the metal fin member has the side end surface formed in a wave form to encroach the resin coating layer.

17. The heat conduction pipe externally covered with the fin member according to claim 1, wherein the metal fin member holds at least one layer of an anticorrosion plating layer on the surface thereof.

18. The heat conduction pipe externally covered with a fin member according to claim 1, wherein said resin comprises polyamide, polypropylene, polyethylene, monomer-cast nylon, polyamide-imide, polypenzo imidazole, polyether ether ketone, polyether imide, polyether sulphon, polyimide, polyphenylene sulfide, polysulfon, polytetralfluoroethylene, tetrafluoroethylene-perfluoro alkoxyalkane, fluoroethylene-propylene, poly chlorotrifluoroethylene, tetrafluoroethylene-ethylene, or ethylene chloro trifluoroethylene.

19. The heat conduction pipe externally covered with a fin member according to claim 1, wherein said resin coating is black.

20. The heat conduction pipe externally covered with a fin member according to claim 1, wherein the metal fin member has said side end surface formed in a wave form where a length of a wave form edge is more than 50% of a width of said fin member.

21. The heat conduction pipe externally covered with a fin member according to claim 1, wherein said pipe or fin has been subjected to anticorrosion anodic oxidation.

22. The heat conduction pipe externally covered with a fin member according to claim 1, wherein the metal fin member has a continuous side end surface opposite said side end surface in contact with the resin coating layer.

* * * * *